United States Patent [19]

Fortune

[11] Patent Number: 5,280,668
[45] Date of Patent: Jan. 25, 1994

[54] DESOLDERING TOOL WITH REPLACEABLE TIP APPARATUS

[76] Inventor: William S. Fortune, 29866 Cuthbert Rd., Malibu, Calif. 90265

[21] Appl. No.: 988,761

[22] Filed: Dec. 10, 1992

[51] Int. Cl.⁵ .......................... A47L 9/02; B23K 3/00
[52] U.S. Cl. ................................. 15/415.1; 15/341; 15/414; 228/20.1
[58] Field of Search ............... 15/415.1, 341; 228/20

[56] References Cited

U.S. PATENT DOCUMENTS

| | | | |
|---|---|---|---|
| 3,549,078 | 12/1970 | Fortune | 15/341 X |
| 4,204,299 | 5/1980 | Fortune | 15/341 X |
| 4,206,531 | 6/1980 | Haeuptli | 15/341 |
| 4,274,176 | 6/1981 | Undin et al. | 15/341 |
| 4,686,737 | 8/1987 | Fortune | 15/341 X |
| 5,081,739 | 1/1992 | Kao | 15/341 |

*Primary Examiner*—Chris K. Moore
*Attorney, Agent, or Firm*—Daniel T. Anderson

[57] ABSTRACT

A replaceable tip for a hand held vacuum stroke desoldering tool. The tip or nozzle element is retained in a bore, in the otherwise closed front end of the tool, by a rear retaining shoulder and a forward compressible skirt-like barb which when radially compressed permits the removal or insertion of the tip element.

2 Claims, 5 Drawing Sheets

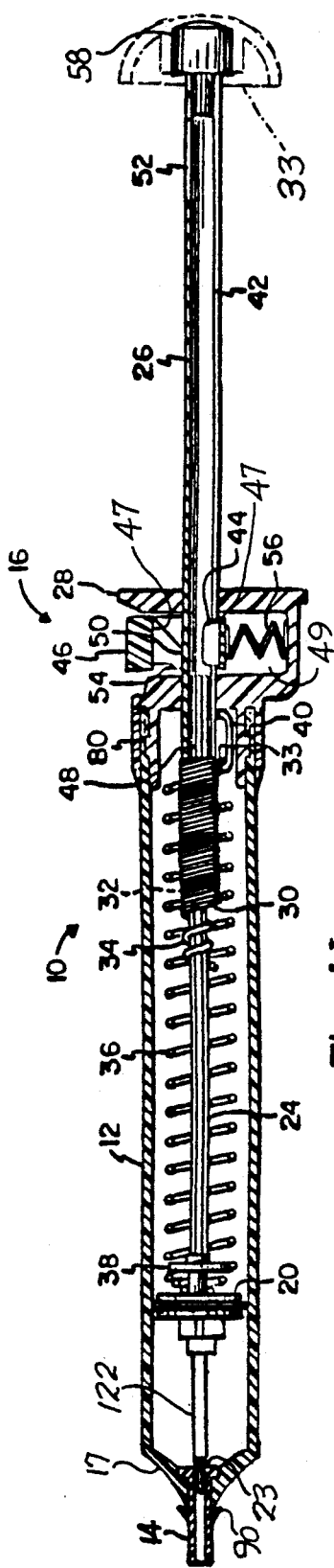

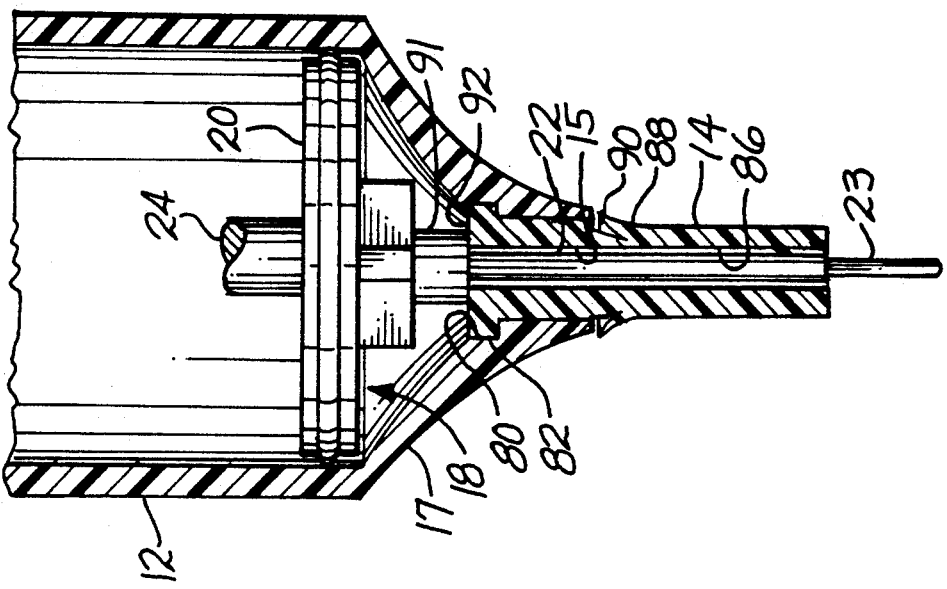
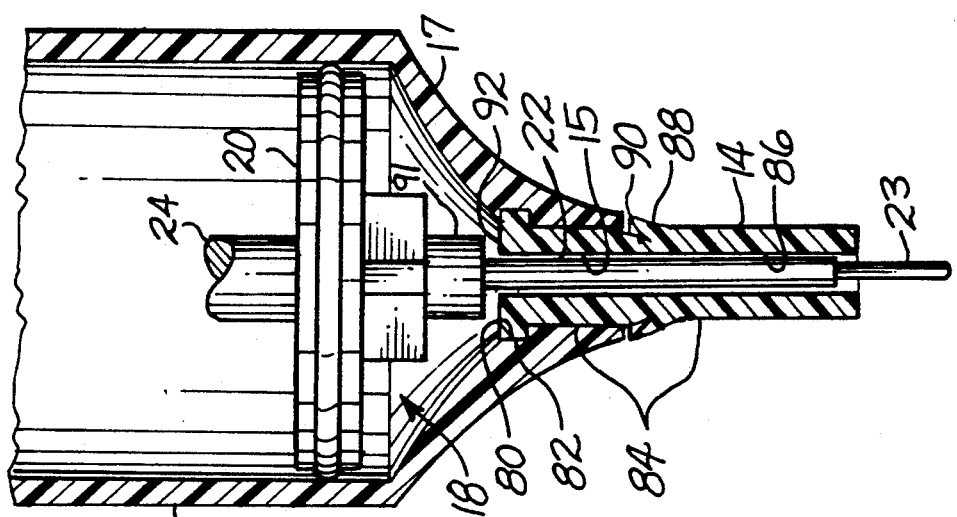
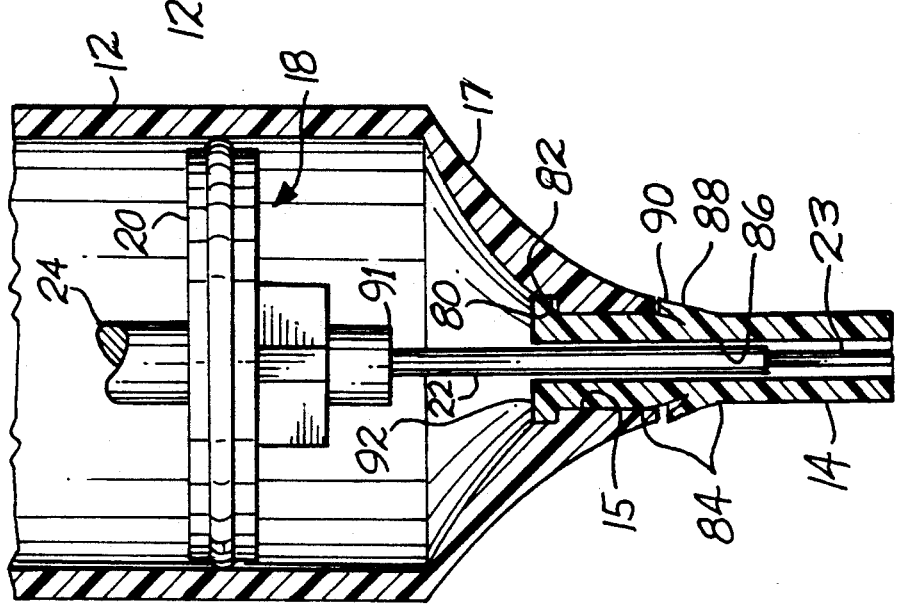

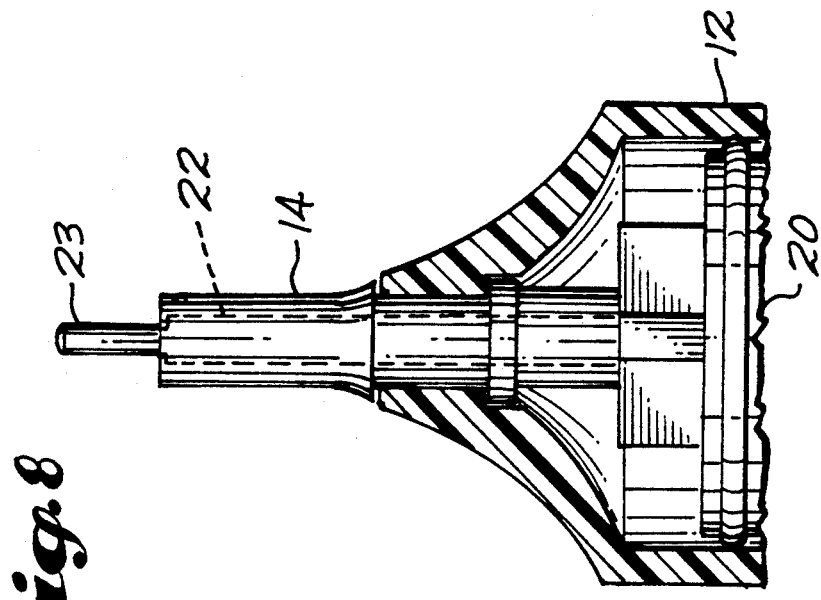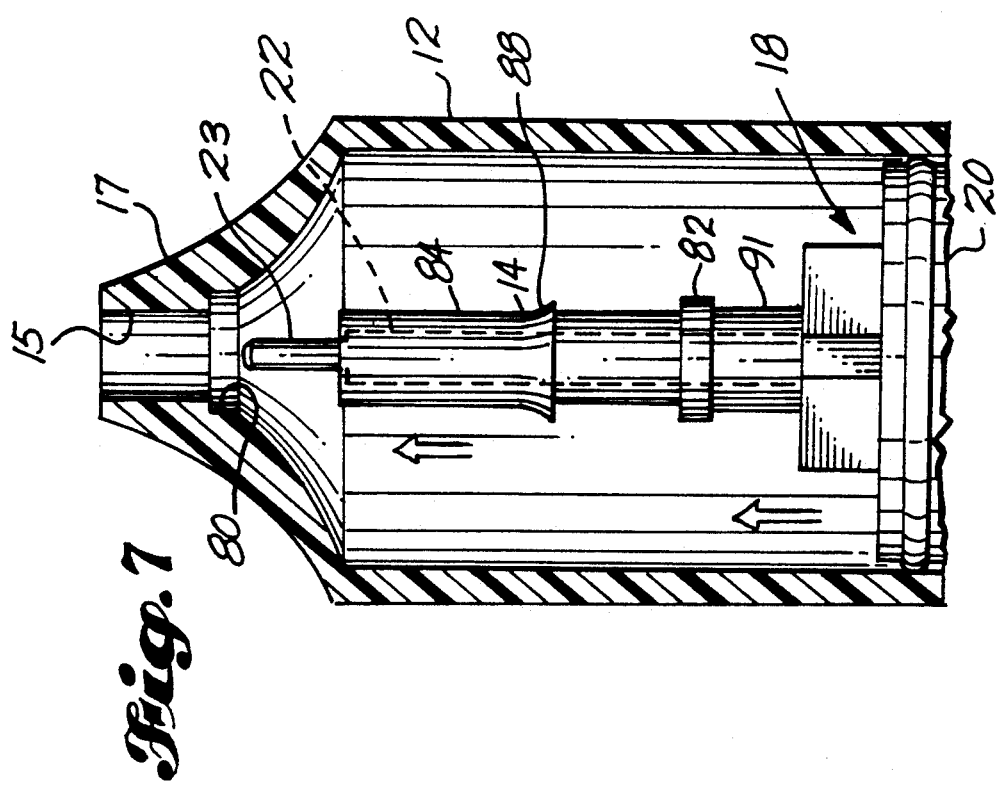

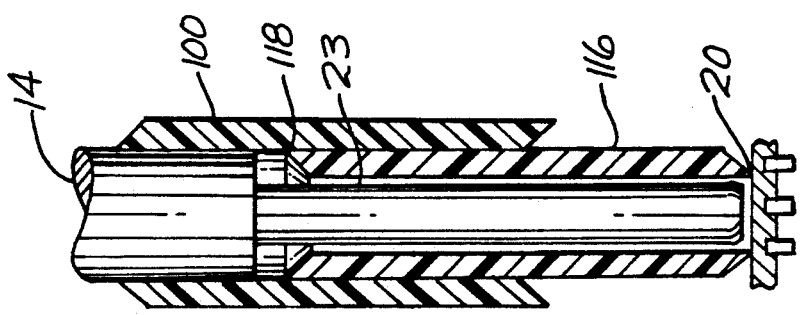
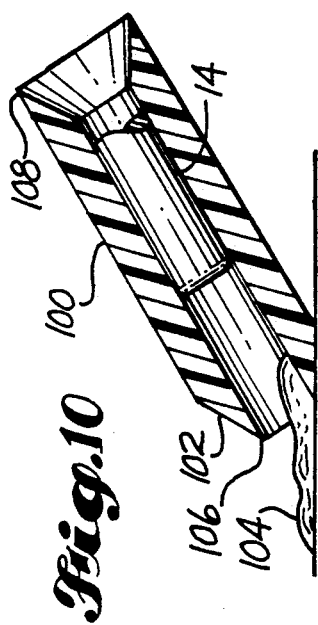
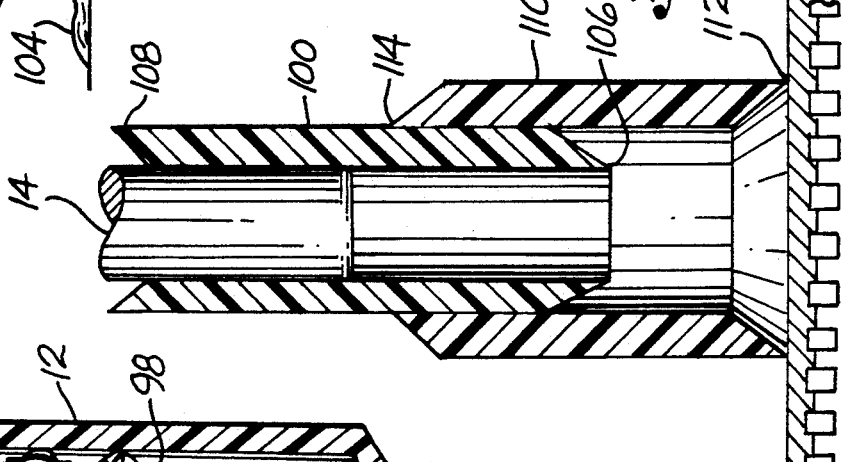
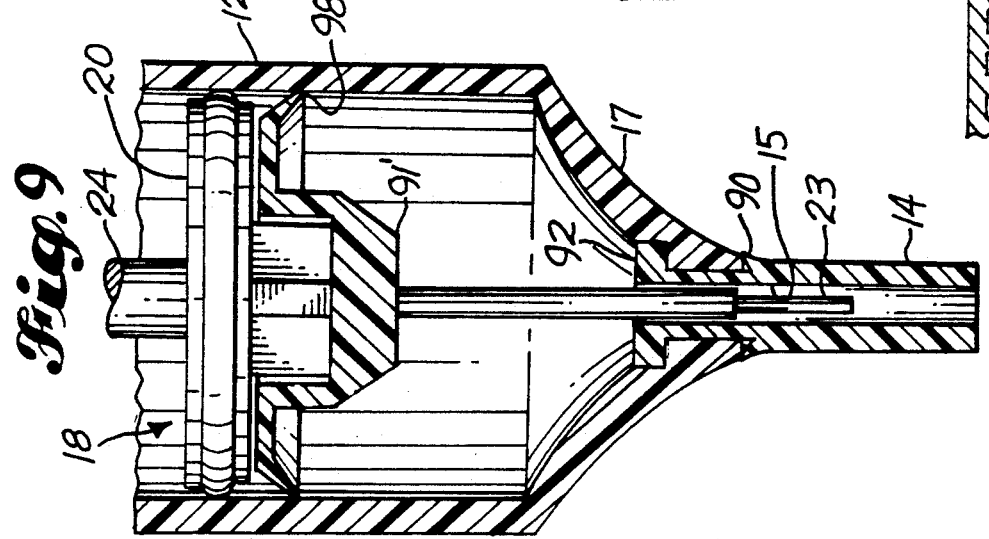

DESOLDERING TOOL WITH REPLACEABLE TIP APPARATUS

BACKGROUND OF THE INVENTION

1. Field of the Invention

The invention relates generally to removing or lifting or drawing away, by air suction technique, small quantities of particulate, liquid, or molten matter and particularly to apparatus improvements in hand held, hand operated vacuum stroke cleaning devices. The present invention finds particularly useful application in the field of soldering, desoldering, and rewiring in electronic laboratories, maintenance shops, factories, or hobbyists' benches; and although, in the cause of clarify and brevity, much of the following discussion and description of examples of the invention are directed theretoward, it is expressly to be understood that the advantages of the invention are equally well manifest in other fields wherever and whenever substances are to be removed or cleaned from an object such, for further example, in medical or dental fields as in removal of foreign objects or unwanted substances from portions of the body including the eye, ear, nose, throat, or open wound or the like.

2. Background of the Invention

In the electrical arts as mentioned, it is often desired to desolder an electrical connection such as, for example, a wire wrapped terminal, a wire to circuit board terminal, the terminals of a surface mounted device such as an integrated circuit chip, or the like. The removal, from the connection, of the molten solder without dropping or spattering it onto other portions of the equipment is generally essential. Blowing or shaking the molten metal away is therefore not an acceptable practice; and, in combination with its high mass density, the high surface tension associated with the solder makes its removal particularly difficult. Furthermore, the problem is aggravated by the requirement that the solder be removed quickly and without application of cooling means before the mechanical connection such as a multiterminal microcircuit chip-to-circuit board or a wire-wrapped terminal may be taken apart.

DESCRIPTION OF PRIOR ART

Since 1963 the art of molten solder removal has been developed, in large measure by the present applicant, with the invention and extensive improvement of hand held, single stroke, spring driven piston desoldering tools having an air intake, or suction, nozzle at their front end for drawing in molten solder as the spring driven piston is triggered by the operator to fly back. The progression of such tools is exemplified by the following U.S. Pat. No. 3,114,026 issued Dec. 10, 1963, to William S. Fortune; U.S. Pat. No. 3,263,889 issued Aug. 2, 1966, to William S. Fortune; U.S. Pat. No. 3,818,539 issued Jun. 25, 1974, to William S. Fortune; U.S. Pat. No. 3,862,468 issued Jan. 28, 1975, to William S. Fortune; and U.S. Pat. No. 4,765,229 issued Aug. 23, 1988, to William S. Fortune and Robert E. Dallons.

For a number of reasons these tools generally utilize a small, tubular plastic nozzle held removably by the front end of the body of the desoldering tool: the plastic is less likely to cause damage by impact upon delicate components; plastics such as Teflon are self-lubricated such that molten solder and flux materials do not fuse with or otherwise stick to them; and such plastics are readily and inexpensively machined and supplied as replaceable, spare parts with choice of configuration with respect to nozzle length, inner diameter, and curvature. When such plastic materials are used, however, they are subject to wear and significant deterioration from the very hot and caustic environment in which the tip inherently operates. Accordingly, their replaceability is important economically.

Particularly commercially significant such replaceable tips and tip replacement apparatus are shown and described in U.S. Pat. No. 4,204,299 issued May 27, 1980 to William S. Fortune, and U.S. Pat. No. 4,919,322 issued Apr. 24, 1990, to Robert E. Dallons and William S. Fortune.

SPECIFIC DISADVANTAGES OF THE PRIOR ART

It has been difficult to provide a replaceable tip which is easy to remove and replace, and the problem is aggravated by the fact that the plastic materials are vulnerable to damage if grasped forcefully by normal tools such as cyas pliers or vice jaws.

A further disadvantage of the prior art is that the outer end of the cocking shaft is typically uncomfortable to the hand of the operator when used under high repetition conditions.

PARTICULAR OBJECTS OF THE INVENTION

Accordingly, it is an object of the present invention to provide a replaceable such desoldering tip which is not subject to these and other disadvantages and limitations.

It is another object to provide a tip which is readily and easily replaceable and which is relatively easy and inexpensive to manufacture.

It is another object to provide such a tip which exhibits a good air seal between it and the front end of the desolderiny tool.

It is another object to provide such a tip and a cooperating tool for very easily and quickly removing and replacing it.

It is another object to provide such a tool which is comfortable and easy to use both in its normal and tip replacement modes.

It is another object to provide a desoldering tool, tip replacing tool, and replacement tip which cooperatively achieve the above advantages.

SUMMARY OF THE INVENTION

Briefly these objects are achieved in the present invention by providing a desoldering tool having a molded plastic front end which includes a protruding end cap which removeably retains a replaceable nozzle element into and through which the working impulse of air draws molten solder or other objects, as noted above. The nozzle element, or tip, is essentially a small diameter hollow cylinder whose outer diameter snugly matches the retaining bore of the end cap. The tip has a retaining shoulder about its inner end which prevents its outward axial movement and an enlarged diameter annular retaining skirt abutting the forward end of the end cap to prevent its inward axial motion. The tip is provided with an annular relief within its skirt portion; and the skirt is radially compressible into the relief such that when so compressed the diameter of the skirt is approximately equal to that of the bore through the end cap. Means are included whereby, when it is required that the tip be removed, the skirt is compressed and pressed axially through the end cap bore and into the working chamber of the tool from whence it may be readily extracted by the operator. The annular skirt compressing means may be a plastic cushion cap carried removeably over the end of the cocking shaft to provide additional comfort for the hand of the operator.

When a tip is to be reinserted into the end cap, means are included for aligning it and pressing it into the end cap bore from within the working chamber. The skirt portion of the nozzle or tip element is compressed by its insertion into and through the bore. When pushed forwardly until its retaining shoulder engages the rear end of the end cap, the skirt emerges from the front end of the bore and self expands to provide retention against any rearward displacement.

The combination and subcombinations of features which characterize and define the invention are set forth with particularity in the Claims. The invention itself, however, both as to structural organization and operation, as well as additional objects and advantages thereof will best be understood from the following description read in connection with the Drawing.

BRIEF DESCRIPTION THE DRAWINGS

FIG. 1A is a longitudinal sectional view of a portable vacuum stroke cleaning or desoldering implement constructed in accordance with the principles of the present invention, the tool being illustrated in its cocked configuration;

FIG. 1B is an enlarged view of the front end portion thereof;

FIG. 2A is a view similar to FIG. 1A illustrating the implement in its storage or shipping configuration;

FIG. 2B is an enlarged view of the front end portion thereof;

FIG. 3A is a sectional view like that of FIG. 2 in which the tip insertion operation is illustrated;

FIG. 3B is an enlarged view of the front end portion thereof;

FIG. 4 is a perspective view of a portion of the structure of the above figures illustrating attachment details of a bayonet type of assembly apparatus for the tool;

FIG. 7 is a like view illustrating a preliminary step in tip reinsertion;

FIG. 8 is a like view illustrating a final step in tip insertion;

FIG. 9 is a view like that of FIG. 1B illustrating an alternative feature of the invention; and FIGS. 10, 11 AND 12 sectional views of a portion of the front tip end of the invention illustrating additional alternative embodiments thereof.

DETAILED DESCRIPTION OF PREFERRED EMBODIMENT

Figure 6:
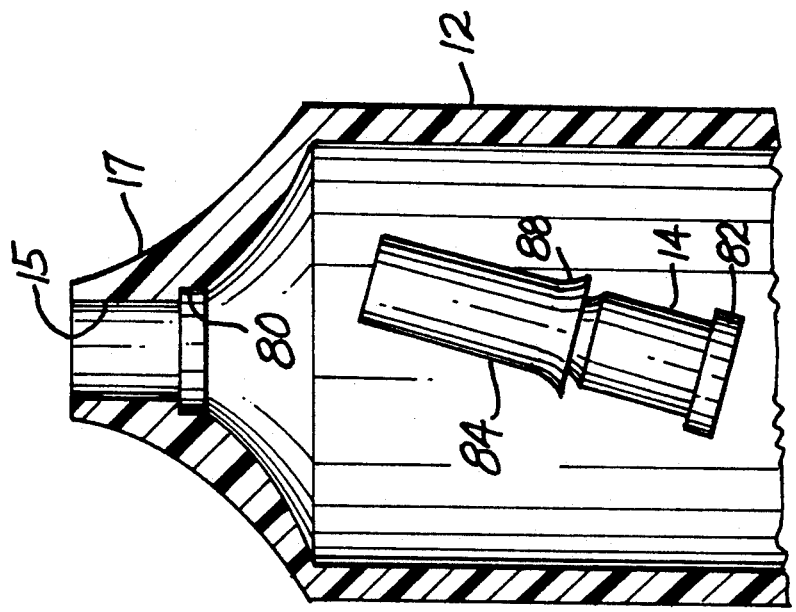
FIG. 6 is a like view illustrating a second step in tip removal.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show or discuss structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention which is defined by the appended claims forming, along with the drawings, a part of this specification.

In FIGS. 1A and 1B, the portable, hand operated vacuum pump 10 illustrated includes a pump body 12 with a removable nozzle or tip 14 retained in a bore 15 and its otherwise closed forward end portion 17, a removable rearward trigger and bushing housing assembly 16. A piston assembly 18 is shown axially slidably disposed within the pump body 10 and includes a piston 20, a forwardly extending cleaning rod 22, and a rearwardly extending alignment shaft 24.

A hollow cocking plunger tube 26 is slidably carried by the trigger housing bushing member 28 and extends, at all times, over at least the rear portion of the alignment shaft 24. The cocking tube is normally returned rearwardly to its disposition, as shown in FIG. 1, by its tension return spring 30 extending between the forward tip end 32 of the cocking tube 26 and a spring end retaining slot 33 formed in the molded bushing housing member 28. It may be noted that the forward few turns 34 of the return spring 30 are of a reduced diameter thereby to retain the tip end of the cocking tube and to provide an impact cushion both when the piston is pushed forwardly by the cocking tube and when the piston flies back against the cocking tube at the end of the high velocity vacuum stroke. A protective cocking shaft head, bumper 58 is carried over the rear end of the tube 26; and the bumper 58 is removably covered by a slip-on cushion cap 33 which, when removed as described below, functions as a tool for removing the tip 14.

The mainspring 36, for creating the vacuum, flyback stroke is a tension spring disposed between a retaining disc 38 on the piston assembly 18 and a second spring end retaining slot 40 formed in the bushing housing member 26.

The cocking tube is provided with a trigger access slot 42 along a major portion of its length whereby the boss portion 44 of the trigger body 46 may project into the slot 42 and engage the rear tip end 48 of the alignment shaft 24 and retain it forwardly in a cocked position against the mainspring 36 all as shown in the configuration of FIGS. 1A and 1B. Thus it may be noted that, in this cocked configuration, the cocking tube 26 is free to slide axially in and out of the bushing housing member 28 for essentially the full length of the access slot 42; of course, inward motion is resisted by the force of the return spring 30 and, when released, it is returned to is fully rearwardly extended position, as shown, by the return spring 30.

The structure of the trigger mechanism includes the trigger body 46 having a transverse opening 47 therethrough to permit passage of the cocking tube 26 which, when in place, retains the trigger body within the main trigger housing bore 49. a trigger spring 56 retained in compression between the bottom of the bore 49 and the bottom of the trigger body 46 tends to urge the trigger body upwardly against the lower edge of the cocking tube 26 at all times.

Referring to FIGS. 2A and 2B, when it is desired to retain the cocking tube within the pump body as for shipping or tool box storage or the like, the cocking tube may be urged further forwardly by, at the same time, depressing the trigger body 46 so that its latch prong 50 enters the shorter, latching slot 52 in the cocking tube. Once the latch prong 50 is so inserted, the cocking tube may be released whereby the forward edge of slot 52 is engaged by the forward edge of the prong 50. A small, friction nub 54 retains the latch prong 50 in engagement with the latching slot edge against the force of the compressed trigger spring 56.

The rear, tip end 57 of the cocking tube 26 is terminated in this example by the molded, rubber-like bumper 58 which is formed with an annual receiving channel 60 into which the tube end 57 may be pressed. An annular retaining barb-like shoulder 62 formed about the outer extremity of the tube end 57 locks the bumper 58 in place. When it is desired deliberately to push the piston assembly further forwardly for purposes of fully inserting the cleaning rod 22 into the nozzle bore of the tip 14 or of inserting, or reinserting a tip as described below, the trigger body must, at the same time, be depressed to remove the boss portion 44 from its interfering position with respect to the forward portion 64 of the bumper 58. The cocking tube 26 may then be pushed forwardly, with the rear edge of the latching slot 52 pushing the trigger body 46 upwardly by its lifting engagement with the ramp portion 66 of the trigger body 46. When this action is complete, as shown in FIGS. 3A and 3B, the bumper 58 is displace fully forwardly against the bushing housing member 28; and the forward tip end 32 of the cocking tube 26 has forcefully inserted a new tip into the front end of the pump body 12. This step is described in detail and in sequence in connection with the discussion of FIG. 8 below.

With reference again to FIG. 2A as well as now to FIG. 4, the bayonet-locked, insertable fit of the reduced diameter forward portion 72 of the bushing housing body 28 into the rear of the pump body 12 as illustrated. The bayonet style ridges 74 on the outer cylindrical surface of the reduced diameter portion 72 of the bushing housing body 28 are of the character to mate in an interlocking relation with the bayonet style grooves and channels 76 formed in the inner cylindrical surface of the rear portion of the pump body 12. An annular retaining shoulder 78 completes the fitting of the pump body to the bushing housing body.

Referring further to FIG. 1B and to the details of the structure of the forward, tip end of the vacuum pump 10, the body 12 is, in this example, molded integrally with its front end portion 17 to form an end cap which is closed except for the nozzle retaining, central bore 15. The rear of the bore 15 is formed with an enlarge diameter portion to provide a nozzle retaining seat 80. The tip 14 is formed with a mating enlarged diameter rear portion 82. This remainder of the body 84 of the length of the tip, or nozzle element 14 has an essentially constant outer diameter and a central bore 86 of constant diameter along its length. A retaining skirt 88 having a rearwardly diverging character and having its greatest diameter, skirt lip portion 90 disposed a distance axially forwardly of the rear end 92 of the nozzle 14 slightly greater than the length of the retaining bore 15. The body of the nozzle element radially inward from the skirt 88 is slightly relieved such that the skirt may be annularly compressed to the diameter of the major portion of nozzle 14 as when it is being injected thereinto as described below.

The cleaning rod 22, a portion of the piston assembly 18, is carried by the piston 20 and extends centrally forwardly therefrom through the bore 86 when the piston assembly is in its forward closed position. The major length of the cleaning rod 22 has a diameter slightly less than that of the bore 86 while its forward minor portion 23 has a reduced diameter to accommodate special tip adapters not shown. It may be noted that the bore of the nozzle is automatically cleaned of solder bits or other foreign matter during each cocking cycle of the tool 10. A nozzle injector hub 91 is also carried centrally forwardly of the piston 20 and functions, as described below in connection with the discussion of FIGS. 3A, 3B and 8, to push and emplace a replacement nozzle 14 into the tip retaining bore 15 of the front-end portion 17.

Referring again to FIG. 2B, the details of the front end 17, the nozzle 14, and the piston assembly 18 are repeated with the vacuum pump 10 being configured in its transport or storage mode. In FIG. 3B the same structure is illustrated with the cocking plunger tube 26 pushed all the way forward so that the injector hub portion 91 of the piston assembly 18 engages the rear 92 of the nozzle 14 and pushes it forwardly into its mating relation with the bore 15 and its nozzle retaining seat 80.

Figure 5:
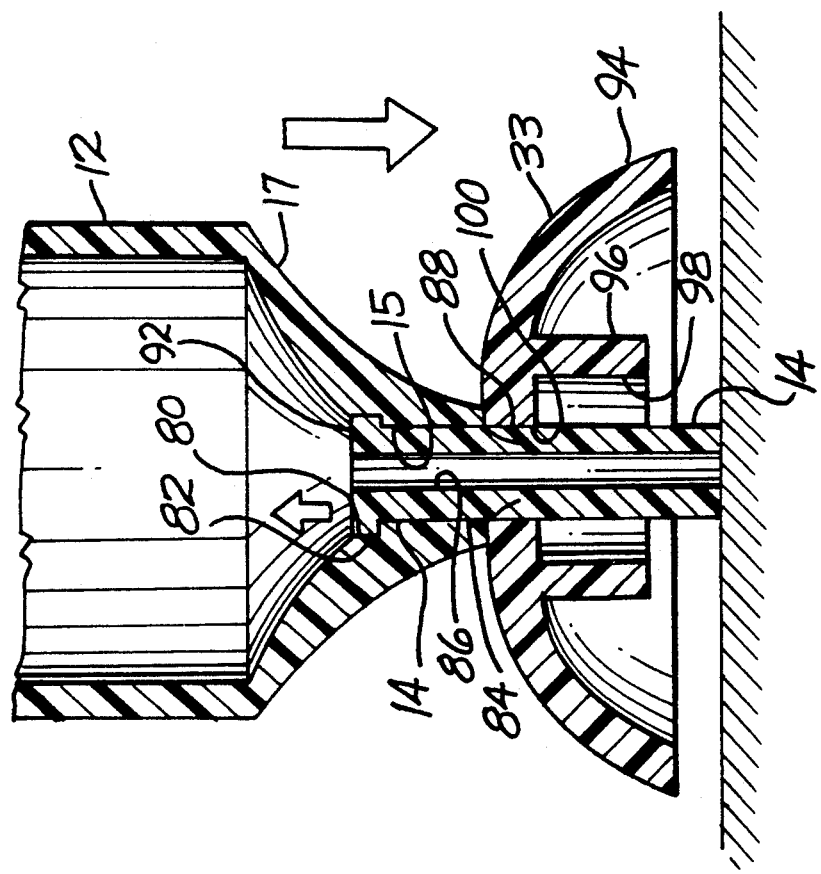
FIG. 5 is a section view of the front end portion of the apparatus of FIGS. 1-3 illustrating a first step in tip removal.

In FIG. 5, the detailed structure of the slip-on cushion cap 33 is seen to include an overall cap body 94 and an inner retaining cap portion 96 formed concentrically within the body 94 and being basically a short hollow cylinder with an inner surface 98 having a diameter approximately equal to the outer diameter of the bumper 58 whereby it forms a snug, slip-on fit thereover. The body 94 may be plastic and thin walled thereby to provide a cushion for the bumper 58 to lessen the likelihood of eye injury to the operator should the cocking plunger tube inadvertently slip from the fingers of the operator during the cocking stroke prior to latching by the trigger mechanism as described above.

A central bore 100 is provided through the cushion cap 33 and has a diameter equal to that of the body 84 of the nozzle 14. The axial length of the cap 33 is significantly less than the length of that portion of the nozzle 14 which extends forwardly of the front end portion 17 of the pump body 12.

In operation, the cap 33 is removed from its slip-on fit on the bumper 58 and its fitted over the nozzle 14 and pushed into contact with the front tip end of portion 17 of the body 12. In so engaging the front of the body 12, the skirt portion 88 of the nozzle 14 is annularly compressed into its recess along the body 84 so that the skirt has the same diameter as the body 84 and the bore 15. Thusly compressed, the tip 14 may be readily pushed upwardly, as viewed in the figure, into the interior of the body 12. Then as viewed in FIG. 6, with the plunger and cocking mechanisms removed, the pump 10 may be turned upright; and the nozzle 14 may be dropped freely into the interior of the body 12 from which it may be readily withdrawn from the rear of the open tool.

To insert a new nozzle 14 into the tool, the replacement nozzle is placed on the cleaning shaft 22, held upright as shown in FIG. 7, and then the piston assembly 18 and cocking mechanism are disposed in the body 12 and moved upwardly to guide the forward portion of the nozzle body 84 into the bore 15 of the front end portion 17 of the tool body 12.

In FIG. 8 the replacement nozzle 14 is shown fully injected through the bore 15 with the skirt 88 having been annularly compressed to the bore diameter during the injection push and having then finally expanded as shown to lock the nozzle firmly into the front end of the tool by virtue of the engagement of the shoulder 82 of the rear of the nozzle 14 with the mating retaining seat 80 of the bore 15 and the "barbed" like skirt 88 preventing any rearward displacement.

Referring to FIG. 9, an alternative to the injector hub 91 is illustrated: a cup edged disc 91' is shown disposed centrally on the cleaning rod 22 over the forwardly projecting portion of the piston assembly 18. The cuplike peripheral edge 98 of the disc 91' is thin and flexible for sweeping along the inner cylindrical surface of the body 12 to remove any bits of foreign material such as solder splattering which have been drawn into the forward chamber by the vacuum stroke action of the piston assembly. By thusly sweeping the cylinder wall with each stroke, it is kept clean and free of particulate matter which could otherwise interfere with the O-ring piston seal. The axial length of the central portion of the disc 91' is the same as that of the injector hub 91 whereby its function in inserting and setting a replacement tip 14 is identical to that described above in connection with the discussion of FIGS. 7 and 8.

In FIG. 10 a silicon rubber sleeve 100 is shown fitted snugly over the nozzle 14 and extending forwardly thereof. The sleeve is provided with a converging conical taper 102 at its forward end whereby molten solder 104 may be drawn into the nozzle 14 aided by the flexible squeegee action of the forward lip 106 of the rubber sleeve. The opposite end of the sleeve may be tapered in a diverging conical fashion as shown to form a lip 108 of slightly larger diameter. In practice the sleeve may be fitted over the tip 14 with either lip 108 or 106, as desired, being disposed forwardly to contact the work.

In FIG. 11, a second, outer silicone rubber sleeve 110 is shown fitted snugly over the first sleeve 10. In this example the forward lip 112 is formed on a diverging conical surface to provide a larger diameter opening for squeegee vacuuming action or, as shown, for vacuum pickup of larger circuit board components, or other parts, such as, for example, a surface mounted micro chip 113. Again, the opposite end of the outer sleeve 110 may be formed as a converging conical surface to form a smaller lip 114 to provide additional versatility in possible lip diameters for a variety of different vacuum tasks.

In FIG. 12 the sleeve 100 is shown fitted snugly over an inner silicone rubber sleeve 116. Again the ends of the working sleeve may be oppositely tapered to provide a choice of different lip diameters: a larger, rearward lip 118 and a smaller, forward lip 120 as shown. the smaller sleeve is useful in the precision desoldering of very small components and may be used, as shown, for vacuum pickup of small parts and components such as the smaller micro circuit chip 122.

The inner diameter of the smaller sleeve 116 may advantageously be selected to be slightly larger than that of the reduced diameter forward portion 23 of the cleaning rod 22 whereby its capillary-like bore may be cleaned by urging the cocking tube 26 all the way forwardly.

There have thus been disclosed and described a portable vacuum stroke cleaning implement and a replaceable tip therefore which exhibit the advantages and achieve the objects set forth above.

I claim:

1. A replaceable tip for a desoldering tool comprising:
   an elongated body being a figure of revolution about a central axis and having a central, axial bore for the inflow and passage, respectively, therethrough of molten or particulate solder and a cleaning rod, the body having rear and forward ends, said body having an axially short, enlarged outer diameter portion contiguous to its said rear end to form thereby a rear retaining shoulder,
   said body being otherwise of essentially constant diameter while having an enlarged outer diameter retaining skirt portion disposed axially between said rear retaining shoulder and said forward end, said skirt portion being substantially conical diverging rearwardly to form a second retaining shoulder,
   said retaining skirt portion being readily radially compressible to approximately said essentially constant diameter of said body.

2. A hand held desoldering tool comprising:
   A. a hollow cylindrical body having an axis and forward and rearward ends, said forward end being essentially closed and being formed to provide a tip retaining axial bore therethrough having a first diameter;
   B. a spring loaded piston assembly disposed in said body and being rapidly moveable rearwardly to provide a desoldering vacuum stroke at said forward end;
   C. a replaceable desoldering tip disposed coaxially in said tip retaining axial bore and having an outer diameter for its major length approximately equal to said first diameter and further including
      an enlarged diameter rear end portion forming a rear retaining shoulder disposed contiguously to the rear of said tip retaining bore of said forward end,
      an enlarged diameter, radially compressible, rearwardly diverging skirt portion disposed forwardly, of and spaced axially from said rear retaining shoulder to form a forward retaining shoulder disposed contiguously to the front of said tip retaining bore, the radial compressibility of said skirt portion being sufficient to permit the skirt diameter when so compressed to be substantially equal to said first diameter, said forward and rear retaining shoulders otherwise being of the character to cooperatively retain said forward end of said desoldering tool body between them with a substantial portion of said replaceable tip being disposed forwardly of said enlarged diameter skirt portion and thereby projecting forwardly of said front end of said desoldering tool body.

* * * * *